Feb. 5, 1963　　　　G. H. YELINEK　　　　3,076,553
FILTER
Filed March 28, 1956

INVENTOR.
Gustav H. Yelinek.
BY
Harness, Dickey & Pierce.
ATTORNEYS.

United States Patent Office 3,076,553
Patented Feb. 5, 1963

3,076,553
FILTER
Gustav H. Yelinek, Racine, Wis., assignor, by mesne assignments, to Walker Manufacturing Company, Racine, Wis., a corporation of Delaware
Filed Mar. 28, 1956, Ser. No. 574,435
5 Claims. (Cl. 210—457)

This invention relates to filter cartridges generally and more particularly to disposable or non-permanent filter cartridges of the type used to filter liquids and gases, for example, oil in lubricating systems, such as lubricating systems in internal combustion engines.

It is an important object of the invention to provide a filter cartridge of especially practical construction consisting of relatively few inexpensive parts and which may be quickly and easily assembled without special tools or equipment.

It is another object of the invention to provide a throwaway type filter cartridge which may be manufactured at extremely low cost, lower in most cases than the cost of cleaning permanent type filter cartridges, but which has superior filtering characteristics.

It is another object of the invention to provide a filter cartridge embodying improved means for retaining the several parts in operative relation whereby an inexpensive assembly is provided; the assembly being of a type which promotes depth-type filtration, but which has a high rate of flow and an exceptionally long useful flow-life.

A further object is to provide an inexpensive, replaceable full flow filter cartridge that may be very advantageously used in combination with a part flow cartridge in a filter embodying both methods of filtration (see Beardsley 2,680,520).

The above and other objects of the invention will be apparent from the following description, reference being had to the accompanying drawing, wherein like numerals are employed to designate like parts throughout the same.

In accordance with the present invention there is shown and described a filter cartridge of the throw-away type particularly adapted for use in oil filters on automotive vehicles. The filter cartridge generally comprises a filter medium 1, a hollow filter tube 2 extending through the center of the filter medium, end caps 3 and 4, and fabric means 5 retaining the elements together as a unitary filter cartridge assembly.

Figure 1:
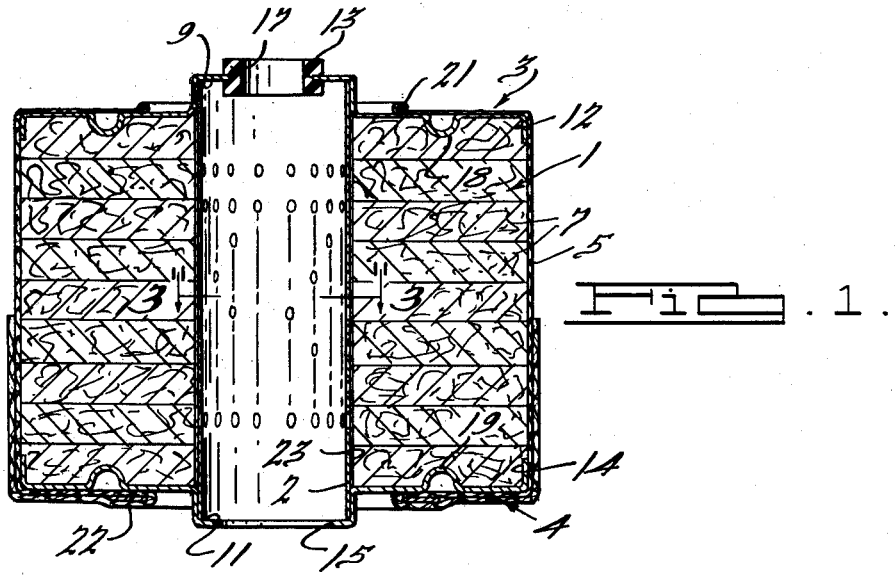
FIGURE 1 is a vertical section of the filter cartridge embodying the present invention.

Considering the structure in more detail, FIGURE 1 is a sectional view on a vertical axis of the filter cartridge. The filter medium 1 preferably comprises a plurality of individual fibrous pads 7. The pads are preferably of sisal which is preeminently superior for the purposes of the present invention because of its low cost and because of the enormous number of edges and voids it provides in which dirt and other foreign material carried by the oil can be trapped. Sisal is a well known material being sometimes described more technically as a strong, durable fibre derived from the leaves of a plant of the genus *Agave sisalina*. The individual sisal pads 7 are preferably circular in cross section and have a central aperture therein, i.e., in the form of apertured discs. The arrangement of the sisal pads collectively in the filter cartridge is such that the individual pads are stacked one above the other and when retained in the assembly they are slightly compacted so that the contacting surfaces of adjacent pads tend to interweave one into the other to present a substantially continuous filter medium.

Figure 2:
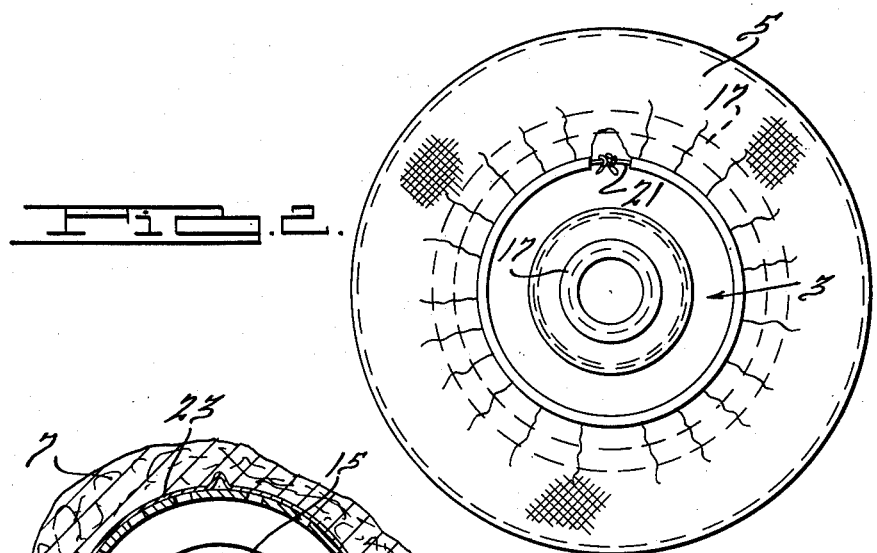
FIG. 2 is a plan view of the structure shown in FIG. 1.

The other elements which make up the filter cartridge will now be described. The filter tube 2 is perforated and extends through the central apertures of the sisal pads 7 and beyond the ends of the filter body 1. At its extremities it carries the end caps 3 and 4. The stamped metal end caps 3 and 4 are substantially identical in construction and have centrally located depressions 9 and 11, respectively, which engage the extremities of the filter tube and inturned peripheral portions 12 and 14 respectively which embrace the filter medium. Apertures 13 and 15, respectively, are formed in the centrally located depressions of the end caps 3 and 4 to provide an oil inlet or outlet depending upon how the cartridge is used. The opening 13 in the centrally located recess 9 of the end cap 3 is shown having affixed therein a grommet 17 to afford a liquid seal at that end about a tubular member, for example, in an oil filter housing in which the cartridge is to be used. For example in FIG. 2 of U.S. Patent 2,680,520, the grommet 17 could be used to provide a seal about tube 51 (replacing seal 54), the present cartridge being used in lieu of filter medium 21 in said patent. When used in combination with a bypass cartridge, the filtering ability of the combination is greatly enhanced since the sisal filtering medium of the cartridge of the present invention traps the large particles and allows only the very finest sludge forming constituents to enter the bypass cartridge thereby greatly extending the life of the bypass filter cartridge. It will also be apparent that the filter cartridge of the present invention may be employed alone in an oil filter unit. For strengthening, the end caps 3 and 4 have annular recesses 18, 19, respectively, which axially protrude into the sistal pads and additionally function to prevent liquid to be filtered from traveling through the cartridge without passing through the filter medium.

The various elements of the cartridge are held together by suitable fabric means. The fabric means is preferably in the form of a tubular cotton sock 5 having open ends. One of the open ends has reinforced stitching so as to retain a drawstring cord 21, while the other is plain for threading through a washer 22 of fibrous composition as will be described. The cotton sock may be knitted, woven, crocheted, formed of netting or by any of the methods well known in the art. It must have the ability to stretch so that it may be easily drawn about the filter medium and the end caps and it must resist being coated by the oil passing through it. A cotton sock made according to the following specifications has been found to possess these properties: knitted cotton sock, 4" machine, 100 needles, one end 14/1 yarn per feed, 3" natural width, 8" stretch width by cutting 2" piece stretched the limit with fingers. The cotton sock not only retains the several parts of the assembly together but also keeps the broken, loose fiber within the filter medium.

Figure 3:
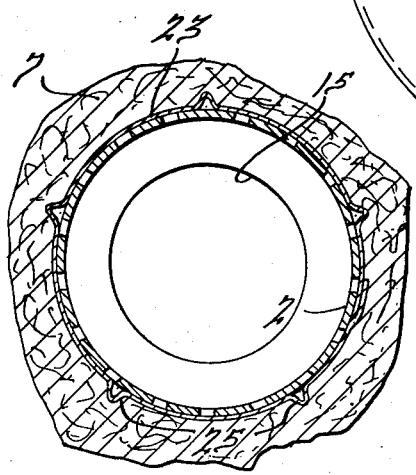
FIG. 3 is a sectional view taken along the line 3—3 of FIG. 1.

Another relatively inexpensive but useful element of the filter cartridge is the tube wrapper which prevents loose, disintegrated fibers of the sisal filter medium from entering the confines of the filter tube 2. The tube wrapper 23 is of a tough oil pervious tissue paper and preferably formed from paper of the type sold under the trademarks Dexstar or Viskon. FIGURE 3 shows the tube wrapper 23 in more detail. The tube wrapper slides over the perforated filter tube and has a plurality of pleats permanently formed therein which extend longitudinally over the length of the tube wrapper and project into the filter medium. The purpose of the pleats is to allow for contraction and expansion of the tube wrapper to prevent tearing on the filter tube as it changes dimensions because of being subjected to alternate conditions of dryness and oil saturation.

In the manufacture of the filter cartridge of the present invention, the sisal pads are most economically formed in the shape of individual circular pads having central apertures. The individual pads have sufficient body to be separately handled and packaged. In assembling the filter cartridge, the tube wrapper 23 is slipped over the perforated filter tube 2 and the sisal pads are stacked one above the other with their central apertures disposed about and closely fitting the tube wrapper and form thereby a relatively dense closely interweaved filter medium which functions as a unit in entrapping foreign particles and sludge forming constituents of the oil in its passage through the cartridge. The end caps 3, 4 are then placed with their central depressions 9, 11 engaging the ends of the tube 2 and with their inturned peripheral portions 12, 14 embracing the ends of the filter medium. One or the other of the end caps may be permanently secured to the tube 2 if desired. The fabric means in the form of the sock 5 is stretched at one of the open ends, pulled over one end cap, drawn up around the sisal pads and then pulled over the other end cap. The open end containing the drawstring is drawn taut about the end cap it embraces, while the plain open end is threaded through the washer 22 and drawn back on itself reversely over the end cap it embraces and around the central portion of the sock, the friction of the fabric weave being sufficient to retain it in place. The cotton sock provides for ready assembly of the filter cartridge and securely retains the several parts together as a unit. The peripheral surfaces of the sisal pads offers an enormous amount of frictional resistance against the cotton sock to prevent relative movement of the parts of the assembly. The stretching of the cotton sock over the rigid end caps causes the end caps to compact the filter medium and the assembly will retain its form without the aid of the drawstring and washer, they being used to insure retention of the assembly under rugged handling.

In operation, the filter cartridge of the present invention may be employed either in conjunction with another filter cartridge, as previously described, or by itself in an oil filter. The oil enters the filter cartridge through the cotton sock 5, passes radially through the sisal pads 7 where the dirt and other foreign particles are captured. The oil then passes through the tube wrapper 23 and into the filter tube 2 by way of the perforations therein and thence through either or both of the openings 13, 15 at the ends of the filter tube. It is evident that, if desired, the direction of flow could be just the reverse. Further, one or both of the end caps could be perforated to provide for longitudinal flow through the filter body in the event the cartridge is to be used in a filter unit accommodating such flow.

It can thus be seen that there has been provided a filter cartridge which can be manufactured at extremely low cost and which consists of a few inexpensive parts which may be quickly assembled into an extremely practical filter cartridge. The filter cartridge has extremely high efficiency with a very high rate of fluid flow and at the same time providing for depth-type filtration, and while clogging of the filter cartridge will occur requiring replacement, it will occur only under extremely severe or long continued use of the filter cartridge.

While the preferred embodiment of the invention has been shown and described, it will be understood that the same is susceptible to variation, alteration and modification without departing from the spirit thereof.

What is claimed is:

1. A filter cartridge comprising a fibrous filter body, rigid metal end caps engaging the ends of the said filter body and having flow diverting projections extending into said body, and fabric means stretched over the said filter body and end caps frictionally engaging the outer surfaces of the said filter body to retain the end caps and filter body in a unitary assembly.

2. A filter cartridge comprising a plurality of compressible fibrous pads, each of said pads having a central aperture, said pads being stacked one above the other with their central apertures aligned to form a filter body having a central passageway therein, a perforated filter tube extending through said central passageway, metal end caps engaging and supporting the ends of the said filter tube and filter body, and fabric means stretched over the said filter body and said end caps frictionally engaging the outer surfaces of the said filter body to compress said pads and to retain the said fibrous pads, end caps and filter tube in a unitary assembly.

3. A filter cartridge comprising a plurality of fibrous pads, each of said pads having a central aperture, said pads being stacked one above the other with their central apertures aligned to form a filter body having a central passageway therein, a perforated filter tube extending through said passageway, rigid end caps engaging and supporting said filter tube and filter body, a washer, and fabric means including a stretchable sock having open ends, said sock being stretched over said filter body and said end caps frictionally engaging the outer surfaces of the said filter body and having one of the said open ends drawn taut about one of the said end caps, and having the other of the said open ends threaded through said washer and drawn back on itself reversely over said washer and the other of the said end caps around the central portions of said sock whereby to retain the said fibrous pads, end caps and filter tube in a unitary assembly.

4. A filter cartridge comprising a plurality of fibrous pads, said pads having central apertures and being stacked one above the other with said central apertures aligned so as to form a longitudinally extending opening throughout the plurality of pads, a perforated metal filter tube extending through said opening and having its extremities disposed beyond the ends of the said pads, rigid end caps fitted over the ends of the said pads and having centrally located depressions with apertures therein engaging the extremities of said filter tube, annular ribs formed in each of said end caps protruding axially into each of the ends of the said pads, and fabric means including a stretchable sock having open ends, said sock being stretched over said cap ends and said pads frictionally engaging the outer surfaces of said pads and having one of said open ends drawn taut about one of the said end caps and having the other of the said open ends drawn back on itself reversely over the other of the said end caps so as to retain said pads, end caps and filter tube in a unitary assembly.

5. A filter cartridge comprising a plurality of circular compressible sisal pads having central apertures and being stacked one above the other so as to align said apertures, a perforated metal filter tube extending through the said aligned apertures and having its extremities disposed beyond the ends of the said pads, a fluid pervious tubular paper wrapper having permanently formed pleats extending longitudinally over the length of said wrapper and embedded in said pads, said wrapper surrounding said filter tube and extending over the length thereof, rigid end caps fitted over the ends of the said pads having centrally located depressions with apertures therein engaging the extremities of the said filter tube, a washer, and fabric means including a stretchable sock having open ends, said sock being stretched over said end caps and said sisal pads frictionally engaging the outer surfaces of said pads and having one of the said open ends drawn taut about one of the said end caps and having the other of the said open ends threaded through said washer and drawn back on itself reversely over the other of the said end caps around the central portion of said sock whereby to compress said pads and to retain said pads, said end caps and said filter tube in a unitary assembly.

References Cited in the file of this patent

UNITED STATES PATENTS

| | | |
|---|---|---|
| 2,156,329 | Beck | May 2, 1939 |
| 2,457,122 | Barley | Dec. 28, 1948 |
| 2,550,070 | La Brecque | Apr. 24, 1951 |
| 2,654,483 | Ahlijian | Oct. 6, 1953 |
| 2,675,919 | White | Apr. 20, 1954 |
| 2,732,077 | Robinson | Jan. 24, 1956 |